United States Patent [19]

Nagasaka

[11] Patent Number: 5,302,002
[45] Date of Patent: Apr. 12, 1994

[54] HIP SUPPORTING APPARATUS OF SEAT
[75] Inventor: Youetsu Nagasaka, Kanagawa, Japan
[73] Assignee: Shiroki Corporation, Kanagawa, Japan
[21] Appl. No.: 764,828
[22] Filed: Sep. 24, 1991
[30] Foreign Application Priority Data Sep. 28, 1990 [JP] Japan .............................. 2-103111[U]

[51] Int. Cl.$^5$ .................................................. A47C 3/00
[52] U.S. Cl. .................................. 297/284.4; 297/284.1
[58] Field of Search ................... 297/284.4, 284.1, 460

[56] References Cited

U.S. PATENT DOCUMENTS

| | | | |
|---|---|---|---|
| 4,913,495 | 4/1990 | Nagasaka et al. | 297/284.4 |
| 4,940,284 | 7/1990 | Nagasaka | 297/284.4 |
| 4,950,032 | 8/1990 | Nagasaka | 297/284.4 X |
| 5,013,087 | 5/1991 | Nagasaka | 297/284.1 |

FOREIGN PATENT DOCUMENTS 59-101850 7/1984 Japan .
61-174462 10/1986 Japan .

Primary Examiner—James R. Brittain
Assistant Examiner—Milton Nelson, Jr.
Attorney, Agent, or Firm—Sandler, Greenblum & Bernstein

[57] ABSTRACT

A seat having a seat cushion and a seat back, including a horizontally extending and rotatable to-and-fro adjustment shaft which is provided in the lower portion of the seat back. A hip support, which is separate from the seat back, is movable backwards and forwards on the seat cushion from the lower portion of the seat back in accordance with the rotation of the to-and-fro adjustment shaft. An adjusting device is used to rotatably adjust the to-and-fro adjustment shaft.

28 Claims, 7 Drawing Sheets

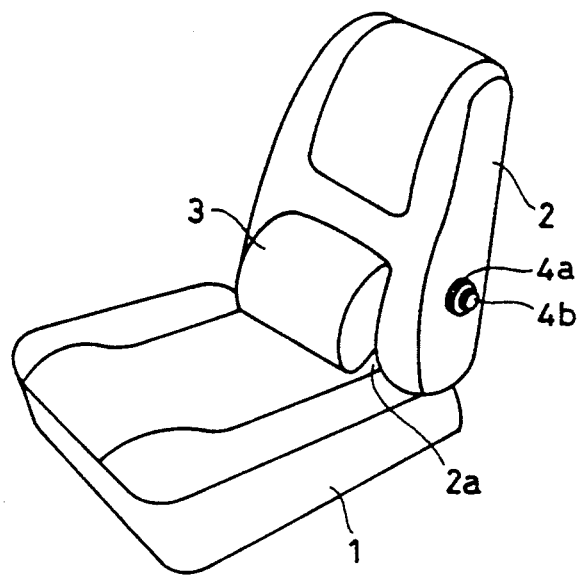
_Fig_-6
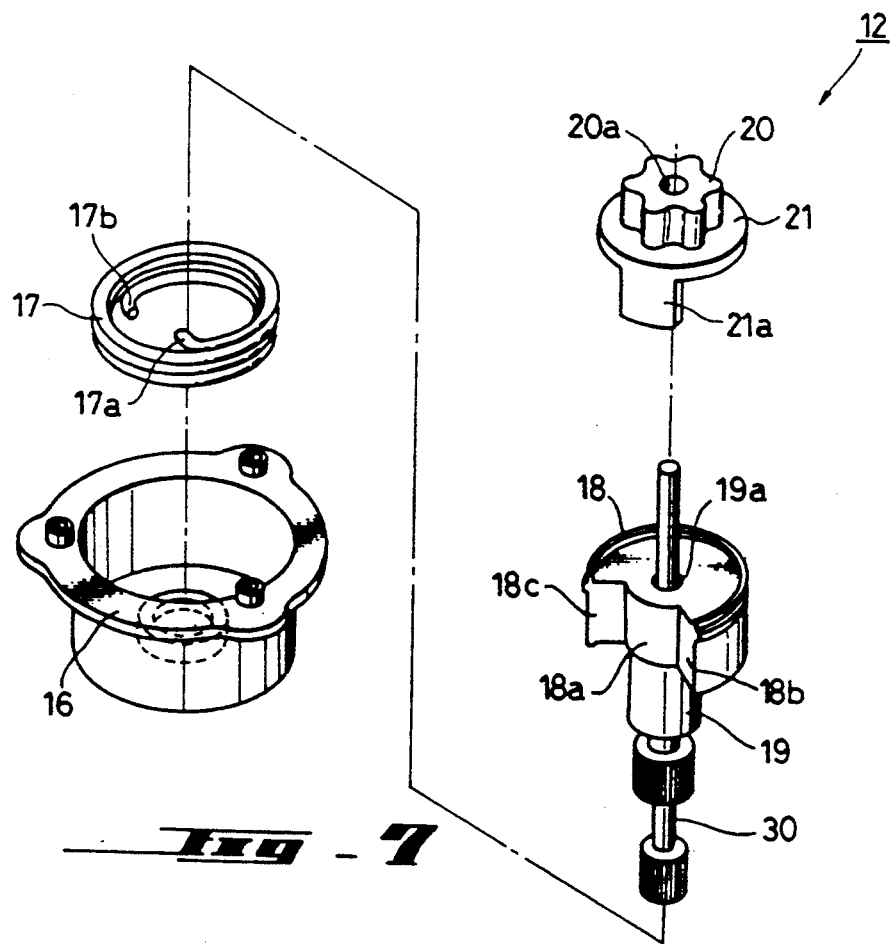
_Fig_-7

HIP SUPPORTING APPARATUS OF SEAT

BACKGROUND OF THE INVENTION

The present invention relates to a seat, and particularly, the front seat (driver's seat) of a vehicle. More precisely, the present invention relates to a hip supporting apparatus of a seat for supporting the lower portion of lumbar vertebrae.

DESCRIPTION OF RELATED ART

There is a known seat having an adjustable hip support which is provided in the recess (space) in the lower portion of a seat back. However, in this known hip support, it is necessary for a driver to rise from the seat in order to adjust the position of the hip support and then seat himself or herself again, which is troublesome. Consequently, it is impossible for the driver to intuitively adjust the position of the hip support.

Furthermore, in the known hip support, only a certain vertical portion of the hip can be supported, and accordingly, variance of the portion of the hip to be supported cannot be optionally selected. The hip support supports the lower portion of the lumbar vertebrae, and accordingly contributes to a mitigation of a general lumbago. Also, the hip support receives the reaction when the driver depresses a pedal, such as a brake pedal, so that the driver's posture may be stabilized.

Preferably, the supporting portion of the hip by the hip support should be adjustable, depending on the physical constitution of the driver or in accordance with need.

SUMMARY OF THE INVENTION

The primary object of the present invention is to provide a seat having a hip support which can be adjusted backwards and forwards by the driver without lifting himself or herself out of the seat.

Another object of the present invention is to provide a seat in which the supporting portion of the hip support can be optionally selected or adjusted.

To achieve the objects mentioned above, according to an aspect of the present invention, there is provided a seat having a seat cushion and a seat back, comprising a horizontally extended and rotatable to-and-fro adjustment shaft which is provided in a lower portion of the seat back, a hip support separate from the seat back and movable backwards and forwards on the seat cushion from the lower portion of the seat back in accordance with the rotation of the to-and-fro adjustment shaft, and means for rotatably adjusting the to-and-fro adjustment shaft.

According to another aspect of the present invention, there is provided a seat having a seat cushion and a seat back, comprising a horizontally extending fitting board shaft which is provided in a lower portion of the seat back, a fitting board which is rotatable about the horizontally extending fitting board shaft, and means for rotatably adjusting the fitting board.

According to still another aspect of the present invention, a seat having a seat cushion and a seat back comprises rotatable first and second operation handles which are coaxially provided on the side of the seat back and independently actuated, a horizontally extended and rotatable to-and-fro adjustment shaft which is provided in the lower portion of the seat back to be rotated by the rotation of the first operation handle, a hip support separate from the seat back and movable backwards and forwards on the seat cushion from the lower portion of the seat back in accordance with the rotation of the to-and-fro adjustment shaft, and a fitting board which is rotatably supported in the hip support and which is rotated by the rotation of the second operation handle.

The present disclosure relates to subject matter contained in Japanese utility model application No. 2-103111 (filed on Sep. 28, 1990) which is expressly incorporated herein by reference in its entirety

BRIEF DESCRIPTION OF THE DRAWINGS

The invention will be described below in detail with reference to the accompanying drawings, in which;

FIG. 6 is a perspective view of a seat to which the present invention is applied;

FIG. 7 is an exploded perspective view of a brake mechanism shown in FIG. 1;

DESCRIPTION OF PREFERRED EMBODIMENT

Figure 1:
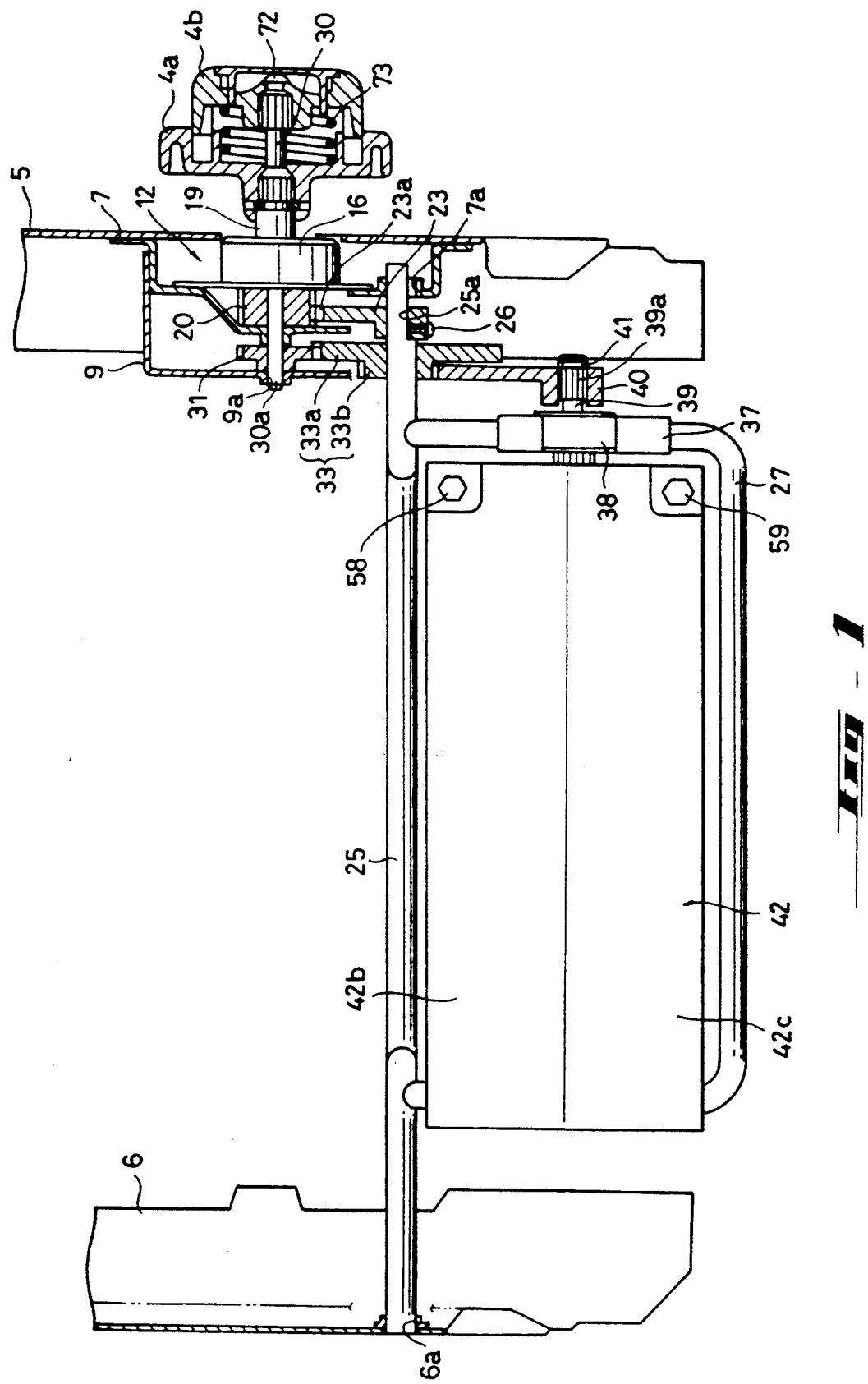
FIG. 1 is a partially cut-away front elevational view of a hip support according to the present invention.
Figure 2:
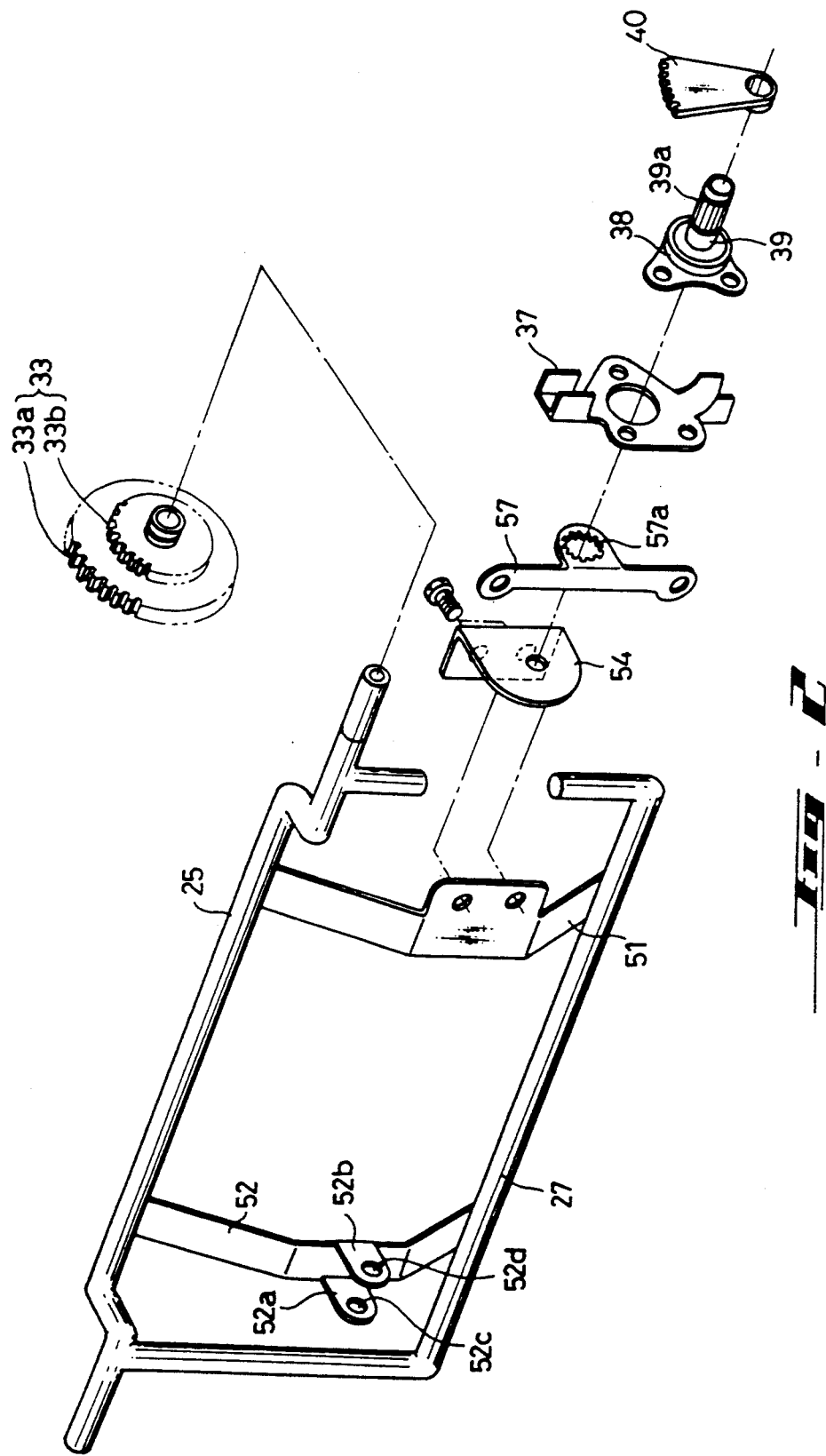
FIG. 2 is an exploded perspective view of a main part of a driving mechanism of a hip support shown in FIG. 1.
Figure 3:
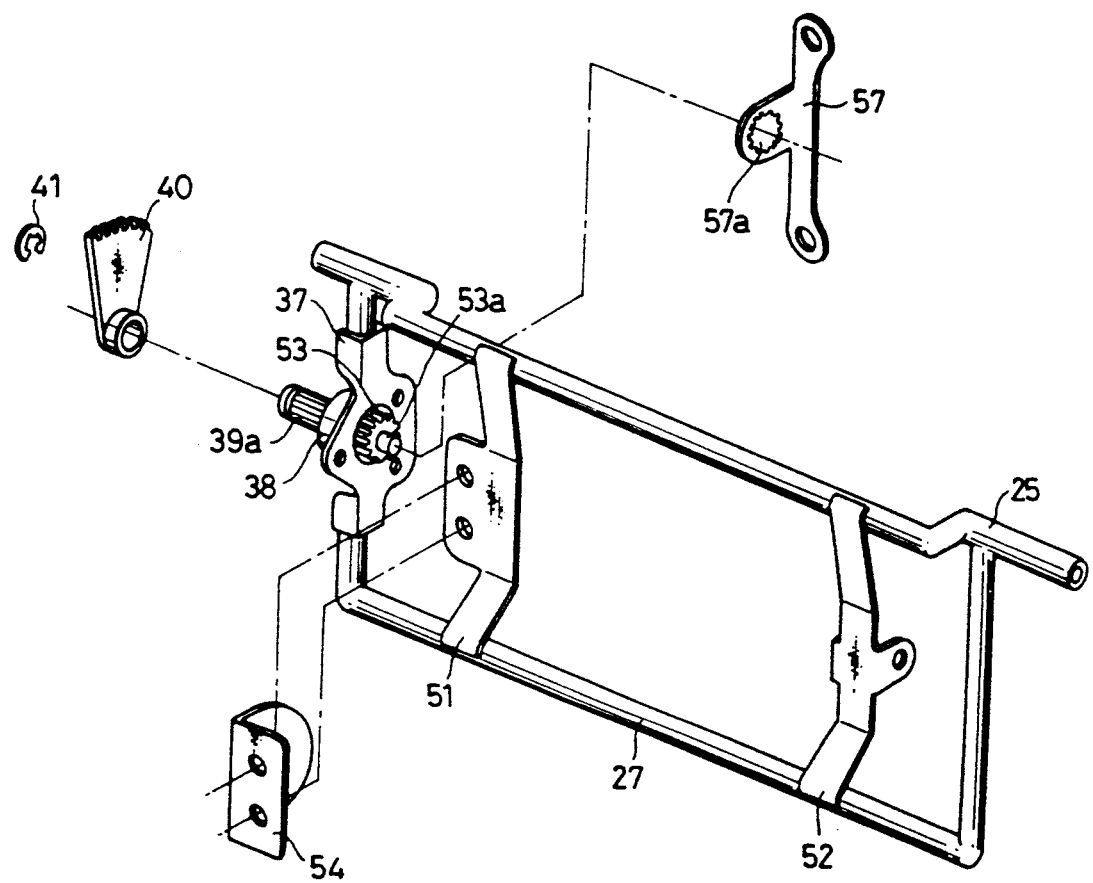
FIG. 3 is a rear view of FIG. 2.
Figure 4:
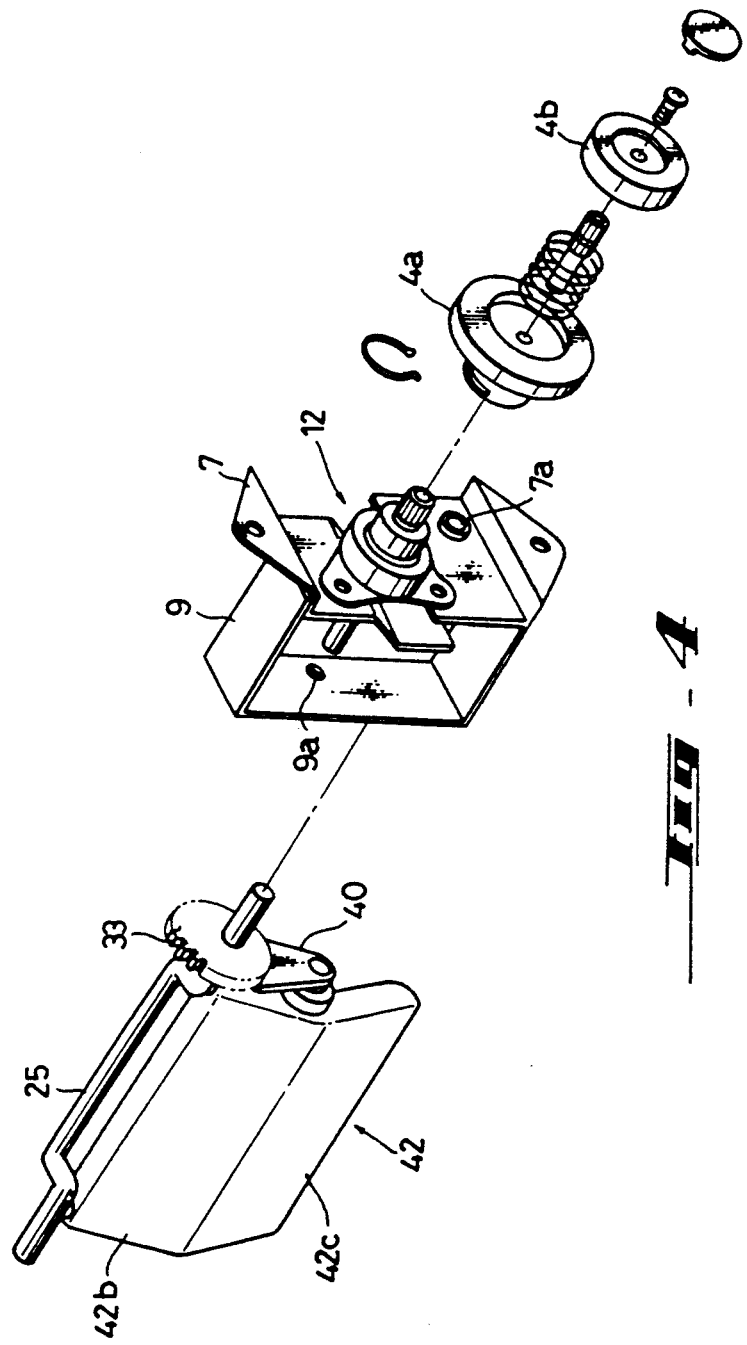
FIG. 4 is an exploded perspective view of surroundings of adjusting handles shown in FIG. 1.
Figure 5:
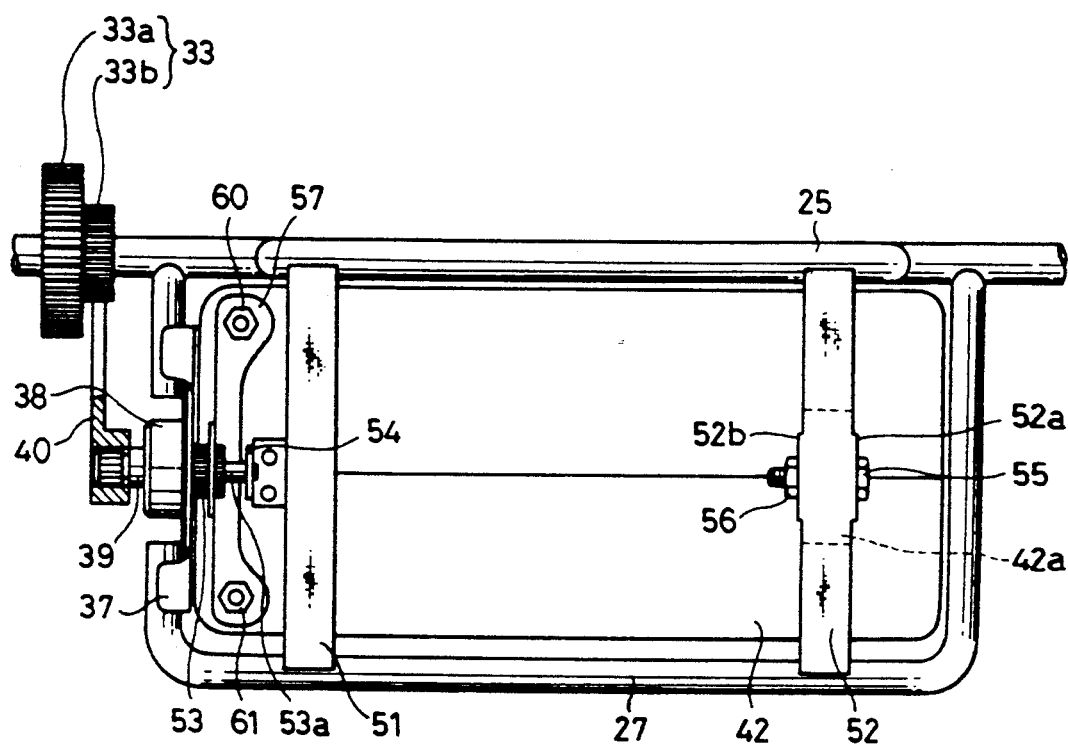
FIG. 5 is a rear view of a fitting board and surroundings thereof shown in FIG. 1.

First, reference is made to FIG. 6, in which a seat according to the invention includes a seat cushion 1 and a seat back 2 connected thereto. A hip support 3 separate from the seat cushion 1 and the seat back 2 is provided in a space 2a which is defined below the seat back 2. First and second adjusting handles (operation handles) 4a and 4b are provided on the seat back 2 to adjust the forward and backward positions of the hip support 3 and the position of a fitting board 42 which is provided in the hip support 3 and which will be described hereinafter, respectively.

In FIG. 1, which shows a mechanism for adjusting the hip support 3 backwards and forwards, side frames 5 and 6 provided on opposite sides of the seat back can be seen. The side frame 5 is provided with a brake mechanism 12, per se known, attached thereto through a base plate 7.

Figure 8:
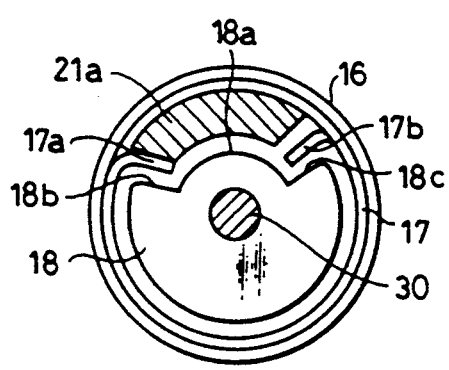
FIGS. 8 and 9 are schematic views of a brake mechanism shown in different operational positions; and, FIG. 10 is an explanatory view of the directions of force and compression in the present invention.
Figure 9:
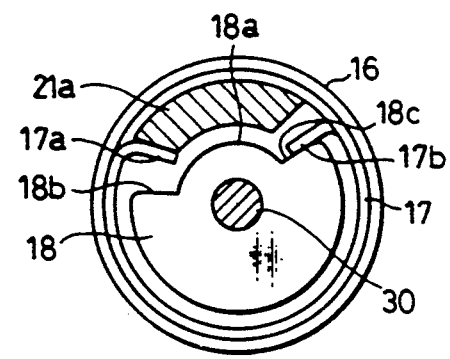

The following discussion will be directed to the brake mechanism 12 shown in FIGS. 7 through 9.

A torsion spring 17 is provided in a brake housing 1 attached to the base plate 7 to abut against the inner wall of the brake housing 16 A core 18 having a recess (cut-away portion) 18a is rotatably inserted in the torsion spring 17. The core 18 is provided with an outer handle shaft 19 integral therewith, to which the first adjusting handle 4a is connected. A pawl 21a of a stopper plate 21 formed integrally with a pinion 20 is inserted in the recess 18a of the core 18 and between hook portions 17a and 17b of the torsion spring 17 at opposite ends thereof. The outer handle shaft 19 and the pinion 20 have through holes 19a and 20a coaxial to each other, in which an inner handle shaft 30 which will be described below is inserted so as to move in the axial direction. Consequently, the pinion 20 is rotatable about the axis of the inner handle shaft 30.

When a rotational force is applied to the pinion 20, the pawl 21a exerts a force against the hook portion 17a or 17b of the torsion spring 17 thereby expanding the torsion spring 17 (i.e., increasing the outer diameter of the torsion spring), as shown in FIG. 8. As a result, the torsion spring 17 exerts an outward force against the brake housing 16 so that no further displacement of the hook portions 17a and 17b takes place. Thus, the rotation of the pinion 20 is braked.

On the other hand, when an operational force is exerted on the first adjusting handle 4a (the outer handle shaft 19), the hook portion 17a or 17b of the torsion spring 17 receives the force from the side end portion 18b or 18c of the core 18 which defines the recess 18a, and accordingly the outer diameter of the torsion spring 17 is reduced, and the contact pressure between the torsion spring 17 and the brake housing 16 decreases, as shown in FIG. 9. When the outer handle shaft 19 begins rotating, the torsion spring 17 is forced to rotate. Consequently, the pawl 21a is rotated by the hook portion 17a or 17b of the torsion spring 17, resulting in a rotation of the pinion 20.

In FIG. 1, a hole 7a is formed in the lower portion of the base plate 7 by a burring tool. A hole 6a is also formed by a burring tool in the lower portion of the side frame 6 to be coaxial with the hole 7a of the base plate 7. A rod (to-and-fro adjustment shaft) 25 is rotatably inserted into the holes 6a and 7a.

The rod 25 is provided, on its end portion close to the side frame 5, with a semi-oval portion 25a having a semi-oval shape in cross section, so that a driven gear 23 is secured to the semi-oval portion 25a by a set screw 26 so as to rotate together with the rod 25. The driven gear 23 has outer peripheral teeth 23a which are in mesh with the pinion 20.

The rod 25 is exposed at the intermediate portion thereof into the space 2a of the seat back 2 so that a support frame 27 which constitutes the core of the hip support 3 is secured to the exposed intermediate portion of the rod 25.

The following discussion will be addressed to the fitting board and the surroundings thereof, with reference to FIGS. 1 through 5.

The inner handle shaft 30 is loosely and rotatably inserted in the outer handle shaft 19. The inner handle shaft 30 is provided on its front end with a semi-oval portion 30a having a semi-oval shape in cross section. The front end of the inner handle shaft 30 is rotatably supported in a hole 9a which is pierced in a bracket 9 by a burring tool. The bracket 9 is provided on the side frame 5. A first gear 31 is secured to the semi-oval portion 30a of the inner handle shaft 30 by a set screw (not shown) so as to rotate together.

A second gear 33 is loosely and rotatably fitted on the rod 25 at the end thereof adjacent to the side frame 5. The second gear 33 has a large diameter gear portion 33a which is in mesh with the first gear 31 and a small diameter gear portion 33b which has fewer teeth than that of the large diameter gear portion 33a.

A brake mechanism 38 is attached to the side frame 27 by a bracket 37. The internal construction of the brake mechanism 38 is identical to that of the brake mechanism 12 mentioned above, and accordingly, no detailed additional explanation is given herein.

The brake mechanism 38 has an input shaft 39 which has a serrated portion 39a on its front end and is fitted in a rotational base portion of a sector gear 40 through an E-ring 41 which prevents the sector gear 40 from accidentally coming out of the serrated portion 39a. The sector gear 40 engages with the small diameter gear portion 33b of the second gear 33.

The fitting board 42 has an upper support surface 42b and a lower support surface 42c and has an outwardly projecting V-shape cross section.

Support brackets 51 and 52 are mounted to the support frame 27 and the rod 25. The support bracket 51 has another support bracket 54 attached thereto, which rotatably supports a fitting board shaft 53a formed at the front end of torque transmitting output pinion 53 of the brake mechanism 38.

The support bracket 52 has supporting portions 52a and 52b which are bent toward the fitting board 42 and which are provided with holes 52c and 52d coaxial to the axis of the shaft 53a. A projection 42a (FIG. 5) projecting from the rear surface of the fitting board 42 is rotatably held between the supporting portions 52a and 52b by a bolt 55 and a nut 56. A fitting board axis is comprised of the fitting board shaft 53a and the bolt 55

A trans-bracket 57 is attached to the rear surface of the fitting board 42 at the end thereof adjacent to the side frame 5 by bolts 58 and 59 passing through the fitting board 42 and nuts 60 and 61. The trans-bracket 57 has a hole 57a (FIG. 3) with a shape corresponding to the cross sectional shape of the pinion 53 so that the latter will fit in the hole 57a.

Thus, the fitting board 42 is rotatably attached to the support frame 27 to be driven by the input shaft 39

In the first position of the fitting board 42 in which it is inclined forward, the upper support surface 42b of the fitting board 42 bears against the lower portion of the lumbar vertebrae of a driver or passenger On the other hand, in a second position of the fitting board 42 in which it is inclined backward, the lower support surface 42c of the fitting board 42 bears against the driver's or passenger's sacrum.

The first adjusting handle (operational handle) 4a is secured to the front end of the inner handle shaft 30 by a screw 72 to project outward beyond the second adjusting handle (operational handle) 4b.

Between the first adjusting handle 4a and the second adjusting handle 4b is provided a spring 73 which biases the first adjusting handle 4a and the inner handle shaft 30 against the side frame 5 to press the first gear 31 against the base plate 7.

The apparatus of the invention, constructed above, operates as follows.

The first adjusting handle 4a is used to adjust the backward and forward positions of the hip support 3. In the position shown in FIG. 1, the pinion 20 is in mesh with the driven gear 23 at one end thereof, and the hip support 3 is accommodated innermost in the space 2a of the seat back 2. When the first adjusting handle 4a is actuated to rotate the pinion 20 through the brake mechanism 12, the driven gear 23 engaging with the pinion 20 is rotated. The rotation of the driven gear 23 causes the rod 25 integral therewith to rotate so that the support frame 27 rotates to project from the seat back 2. Consequently, the hip support 3 moves forwards out of the space 2a above the seat cushion 1. The movement of the hip support 3 can continue until the pinion 20 comes into engagement with the driven gear 23 at the opposite end thereof.

If the first adjusting handle 4a is reversed, the hip support 3 is retracted into the space 2a of the seat back 2. The position of the hip support 3 thus adjusted is maintained by the brake mechanism 12 so long as the first adjusting handle 4a is not actuated.

The inclination of the fitting board 42 by the second adjusting handle 4b will be explained below.

Figure 10:
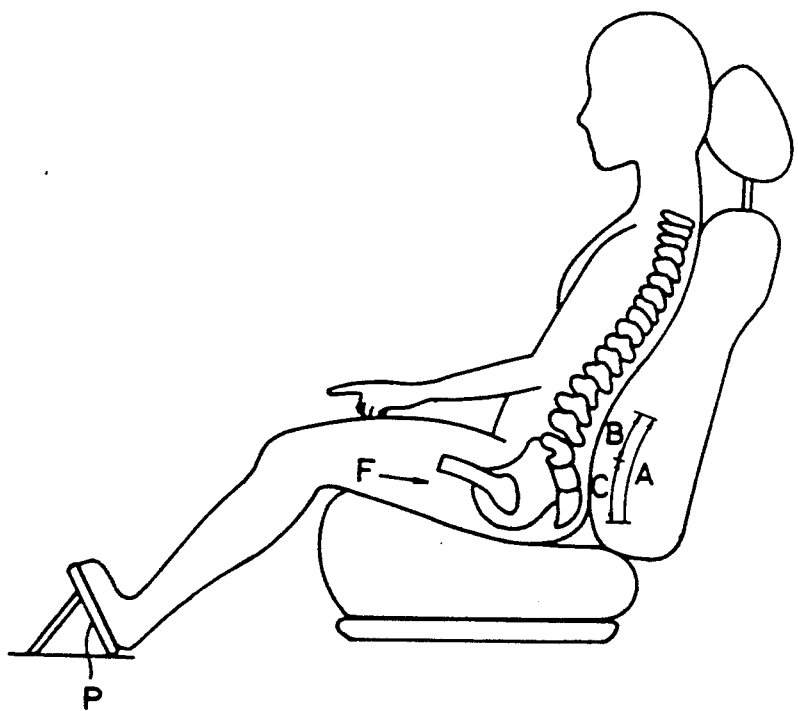

When the second adjusting handle 4b is rotated, the first gear 31 is rotated through the inner handle shaft 30. The rotation of the first gear 31 is transmitted to the sector gear 40 through the second gear 33 rotatably attached to the rod 25. The rotation of the sector gear 40 causes the fitting board 42, rotatably attached to the support frame 27, to incline When the fitting board 42 is inclined forwards the upper support surface 42b of the fitting aboard 42 projects forwards to bear against the lower portion of the lumbar vertebrae, and when the fitting board 42 is inclined backwards, the lower support surface 42c of the fitting board 42 projects forwards to bear against the sacrum which is located below the lumbar vertebrae. Namely, the driver or passenger can select either the lower portion of the lumbar vertebrae or the sacrum to be supported. Consequently, the hip support 3 supports not only the lower portion B of the lumbar vertebrae to generally mitigate a lumbago, but also the sacrum C to stabilize the posture when the driver operates the pedal P, as can be seen in FIG. 10.

The position of the fitting board 42 thus adjusted is maintained by the brake mechanism 38 so long as the second adjusting handle 4b is not actuated.

The driver can actuate the first adjusting handle 4a to carry out the to-and-fro adjustment of the hip support 3 while remaining seated. Furthermore, since the adjustment is continuous rather than step-adjustable, the driver can obtain a desired extent or strength of hip support.

In the illustrated embodiment, the first and second adjusting handles (operation handles) 4a and 4b are coaxially provided on the same shaft for easy operation.

Furthermore, when actuating the second adjusting handle 4b, the operator may depress the first adjusting handle 4a against the spring 73, and accordingly toward the side frame 5, so as to firmly grasp the second adjusting handle 4b. In addition, the first and second adjusting handle look like a single handle, resulting in a good appearance.

Since the operational forces of the first and second adjusting handles 4a and 4b are all transmitted to the rod (to-and-fro adjustment shaft) 25 and the fitting board 42 through the gears, no transmission failure occurs. This also improves the operability.

The present invention is not limited to the illustrated embodiment and can be modified by a person skilled in the art. For instance, the cross sectional shape of the fitting board 42 can be circular, instead of V-shaped.

I claim:

1. A seat having a seat cushion and a seat back having a lower portion, comprising:
   a horizontally extending and rotatable to-and-fro adjustment shaft which is provided in said lower portion of said seat back;
   a hip support separate from said seat back and movable backwards and forwards on said seat cushion from said lower portion of said seat back in accordance with the rotation of said to-and-fro adjustment shaft;
   means for rotatably adjusting said to-and-fro adjustment shaft;
   a fitting board, provided in said hip support;
   means for adjusting the position of said fitting board wherein said position adjusting means of said fitting board comprises a horizontal fitting board shaft separate from said to-and-fro adjustment in said hip support, with said fitting board being rotatable about said fitting board shaft, and means for rotatably adjusting said fitting board, and wherein said means for rotatably adjusting said fitting board comprises a first rotatable operation handle and a gear train which transmits the rotation of said first rotatable operation handle to said fitting board shaft;
   means, removably secured to said fitting board, for connecting said fitting board to said fitting board shaft; and
   torque transmitting means mounted on said fitting board shaft;
   wherein said means for connecting comprises a hole with a shape corresponding to a shape of said torque transmitting means.

2. A seat according to claim 1, further comprising:
   a shaft upon which said rotatable operation handle is mounted,
   wherein said gear train interconnects said fitting board shaft and said shaft upon which said rotatable operation handle is mounted.

3. A seat according to claim 1, wherein said fitting board is adapted to be removed from said means for connecting, so that another fitting board may be secured to said means for connecting.

4. A seat according to claim 1, wherein said means for adjusting the position of said fitting board further comprises a brake mechanism which prevents said fitting board shaft from being rotated when a rotational force is exerted on said fitting board shaft through said fitting board.

5. A seat according to claim 1, wherein said means for rotatably adjusting said to-and-fro adjustment shaft comprises a second rotatable operation handle, a gear mechanism for transmitting the rotation of said second rotatable operation handle to said to-and-fro adjustment shaft, and a brake mechanism which prevents said to-and-fro adjustment shaft from being rotated when a rotational force is exerted on said to-and-fro adjustment shaft through said hip support.

6. A seat according to claim 5, wherein said first rotatable operation handle and said second rotatable operation handle are coaxial with one another.

7. A seat according to claim 6, wherein said seat back has a side portion and said operation handle of said to-and-fro adjustment shaft and said operation handle of said means for rotatably adjusting said fitting board are provided on said side portion of said seat back.

8. A seat according to claim 6, wherein said gear train for transmitting the rotation of said first operation handle to said fitting board shaft comprises a gear which is rotatably supported by said to-and-fro adjustment shaft.

9. A seat according to claim 6, wherein said fitting board has upper and lower supporting surfaces divided with respect to said fitting board shaft.

10. A seat according to claim 9, wherein said fitting board is generally V-shaped with a projecting apex line along which said fitting board shaft extends.

11. A seat according to claim 10, wherein said upper and lower supporting surfaces of said fitting board are adapted to abut against lumbar vertebrae and the sacrum of a passenger or driver, respectively.

12. A seat according to claim 1, wherein said to-and-fro adjustment shaft is provided with a support frame which integrally extends downward therefrom, so that said hip support, which covers said support frame, is rotatable together with said support frame about an axis of said to-and-fro adjustment shaft.

13. A seat according to claim 12, wherein said fitting board is attached to said support frame in a rotatable manner.

14. A seat according to claim 13, wherein said fitting board has upper and lower supporting surfaces divided with respect to said fitting board shaft.

15. A seat according to claim 14, wherein said fitting board is generally V-shaped with a projecting apex line which is adjacent to a line along which said fitting board shaft of said fitting board extends.

16. A seat according to claim 15, wherein said upper and lower supporting surfaces of said fitting board are adapted to abut against lumbar vertebrae and the sacrum of a passenger or driver, respectively.

17. A seat having a seat cushion and a seat back having a lower portion, comprising:
a horizontally extending fitting board shaft which is provided in said lower portion of said seat back;
a fitting board which is rotatable about said horizontally extending fitting board shaft;
means, removably secured to said fitting board, for connecting said fitting board to said fitting board shaft;
torque transmitting means mounted on said fitting board shaft, wherein said means for connecting comprises a hole with a shape corresponding to a shape of said torque transmitting means; and
means for rotatably adjusting said fitting board; wherein said means for rotatably adjusting comprises a gear train which transmits rotation to said fitting board.

18. A seat according to claim 17, wherein said means for rotatably adjusting further comprises:
a rotatable operation handle, wherein said gear train is operatively connected between said operation handle and said fitting board shaft for transmission of rotary force to said fitting board.

19. A seat according to claim 15, wherein said fitting board is adapted to be removed from said means for connecting, so that another fitting board may be secured to said means for connecting.

20. A seat according to claim 17, wherein said fitting board has upper and lower supporting surfaces divided with respect to said fitting board shaft.

21. A seat according to claim 20, wherein said fitting board is generally V-shaped with a projecting apex line along which said fitting board shaft extends.

22. A seat according to claim 21, wherein said upper and lower supporting surfaces of said fitting board are adapted to abut against lumbar vertebrae and the sacrum of a passenger or driver, respectively.

23. A seat having a seat cushion and a seat back having at least one side and a lower portion, comprising:
first and second operation handles which are coaxially provided on said side of said seat back and which are independently and rotatably actuated;
a horizontally extending and rotatable to-and-fro adjustment shaft which is provided in said lower portion of the seat back to be rotated by the rotation of said first operation handle;
a hip support which is separate from said seat back and movable backwards and forwards on said seat cushion from said lower portion of said seat back in accordance with the rotation of said to-and-fro adjustment shaft;
a fitting board which is rotatably supported in said hip support and which is rotated by the rotation of said second operation handle;
a gear train which transmits the rotation of said second operation handle to said fitting board, said gear train having a gear which is rotatably fitted on said to-and-fro adjustment shaft;
means, removably secured to said fitting board, for connecting said fitting board to a fitting board shaft; and
torque transmitting means mounted on said fitting board shaft;
wherein said means for connecting comprises a hole with a shape corresponding to a shape of said torque transmitting means.

24. A seat according to claim 23, wherein said fitting board is adapted to be removed from said means for connecting, so that another fitting board may be secured to said means for connecting.

25. A seat according to claim 23, further comprising:
said fitting board shaft extends horizontally and said fitting board is rotatably mounted upon said fitting board; and
a shaft upon which said second operation handle is mounted,
wherein said gear train interconnects said fitting board shaft and said shaft upon which said second operation handle is mounted.

26. A seat according to claim 23, wherein said fitting board has upper and lower supporting surfaces divided with respect to said fitting board shaft.

27. A seat according to claim 26, wherein said fitting board is generally V-shaped with a projecting apex line along which said fitting board shaft extends.

28. A seat according to claim 27, wherein said upper and lower supporting surfaces of said fitting board are adapted to abut against lumbar vertebrae and the sacrum of a passenger or driver, respectively.

* * * * *